US012637947B2

(12) United States Patent
Saha et al.

(10) Patent No.: US 12,637,947 B2
(45) Date of Patent: May 26, 2026

(54) MATERIAL SYSTEMS FOR REPAIR OF THERMAL BARRIER COATING AND METHODS THEREOF

(71) Applicant: General Electric Company, Schenectady, NY (US)

(72) Inventors: Atanu Saha, Bengaluru (IN); Hrishikesh Keshavan, Bengaluru (IN); Mamatha Nagesh, Bengaluru (IN); Ambarish J. Kulkarni, Niskayuna, NY (US); Bernard P. Bewlay, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 68 days.

(21) Appl. No.: 18/239,532

(22) Filed: Aug. 29, 2023

(65) Prior Publication Data

US 2024/0084703 A1 Mar. 14, 2024

(30) Foreign Application Priority Data

Sep. 8, 2022 (IN) ............................. 202211051336

(51) Int. Cl.
*F01D 5/00* (2006.01)
*F01D 5/28* (2006.01)

(52) U.S. Cl.
CPC ............. *F01D 5/005* (2013.01); *F01D 5/288* (2013.01); *F05D 2230/80* (2013.01); *F05D 2300/2118* (2013.01); *F05D 2300/611* (2013.01)

(58) Field of Classification Search
CPC ...... F01D 5/005; F01D 5/288; F05D 2230/80; F05D 2300/2118; F05D 2300/611
See application file for complete search history.

(56) References Cited

U.S. PATENT DOCUMENTS

| | | | |
|---|---|---|---|
| 5,972,424 | A | 10/1999 | Draghi et al. |
| 7,476,703 | B2 | 1/2009 | Ruud et al. |
| 7,842,335 | B2 | 11/2010 | Skoog et al. |

(Continued)

FOREIGN PATENT DOCUMENTS

| | | | |
|---|---|---|---|
| CN | 109930102 | A | 6/2019 |
| EP | 3202954 | B1 | 12/2019 |

OTHER PUBLICATIONS

Extended European Search Report for Application No. 23195249.0 dated Mar. 4, 2024 (7 pages).

(Continued)

*Primary Examiner* — James M Mellott
(74) *Attorney, Agent, or Firm* — Dority & Manning, P.A.

(57) ABSTRACT

Methods for repairing a thermal barrier coating deposited on a component with localized spallation of the thermal barrier coating includes depositing a primer slurry on a thermally grown oxide of the component exposed by the localized spallation, depositing a ceramic slurry on the primer slurry, and heating the primer slurry and the ceramic slurry. The primer slurry includes a primer that includes at least one of a metal and a metal oxide. The ceramic slurry includes a ceramic material, a ceramic slurry binder material, and a ceramic slurry fluid carrier. Heating the primer slurry and the ceramic slurry forms a first chemical bond between the primer and the thermally grown oxide and a second chemical bond between the primer and the ceramic material.

19 Claims, 4 Drawing Sheets

(56) References Cited

U.S. PATENT DOCUMENTS

| | | | |
|---|---|---|---|
| 7,981,519 B2 | 7/2011 | Holland et al. | |
| 8,221,825 B2 | 7/2012 | Reitz et al. | |
| 9,387,512 B2 | 7/2016 | Lee et al. | |
| 10,094,220 B2 | 10/2018 | Vontell, Sr. et al. | |
| 10,384,978 B2 | 8/2019 | McEvoy et al. | |
| 10,759,022 B2 | 9/2020 | Sens et al. | |
| 10,822,966 B2 | 11/2020 | Chapman et al. | |
| 10,927,684 B2 | 2/2021 | Bogue et al. | |
| 11,549,382 B2 | 1/2023 | Keshavan et al. | |
| 11,655,720 B2 | 5/2023 | Keshavan et al. | |
| 2004/0214938 A1* | 10/2004 | Ruud | C04B 35/481 427/140 |
| 2005/0287296 A1* | 12/2005 | Wadley | C23C 14/548 118/723 VE |
| 2008/0131711 A1 | 6/2008 | Kulkarni et al. | |
| 2010/0237134 A1 | 9/2010 | Bucci et al. | |
| 2017/0122561 A1 | 5/2017 | Nagaraj | |
| 2018/0058228 A1 | 3/2018 | Berger et al. | |
| 2018/0223410 A1 | 8/2018 | Offer et al. | |
| 2021/0171409 A1* | 6/2021 | Ucasz | C04B 41/5096 |
| 2021/0340388 A1 | 11/2021 | Everhart et al. | |

OTHER PUBLICATIONS

Sampson “Rolls-Royce to Lead Major Research Program on Aircraft Engine Inspection and Repair”, Aerospace Testing International, Nov. 10, 2020, https://www.aerospacetestinginternational.com/news/engine-testing/rolls-royce-to-lead-major-research-program-on-aircraft-engine-inspection-and-repair.html.

* cited by examiner

MATERIAL SYSTEMS FOR REPAIR OF THERMAL BARRIER COATING AND METHODS THEREOF

CROSS-REFERENCE TO RELATED APPLICATION

This application claims the benefit of priority of Indian Application No. 202211051336, filed on Sep. 8, 2022, and entitled "Material Systems For Repair of Thermal Barrier Coating and Methods Thereof", the contents of which are relied upon and incorporated herein by reference in their entirety as if fully set forth below.

TECHNICAL FIELD

The present specification generally relates to thermal barrier coatings, associated material systems, and methods of coating and repair.

BACKGROUND

The use of thermal barrier coating (TBC) on components such as combustors, turbine blades, vanes and shrouds helps such components to survive higher operating temperatures, increases component durability, and improves engine reliability. TBC is typically formed of a ceramic material and deposited on a bond coat to form a material system.

During engine operation, TBC may be damaged due to temperature cycling, calcium-magnesium-alumino-silicate (CMAS) infiltration, foreign object damage, and other reasons. This damage may result in spallation, or localized loss of TBC. Accordingly, it may be beneficial to repair the TBC coating so as to protect the component from further damage during engine operation.

Conventional methods of repairing TBC frequently require disassembling the component from the engine, stripping any remaining TBC, and recoating the component. For these reasons, conventional methods of repairing TBC may be costly and time intensive. Some other methods of repairing TBC enable new TBC to be sprayed into the component in situ. However, in many instances, these methods fail to produce long-lasting TBC, and the repaired areas are prone to spall again quickly. This is, in part, because the bond coat that is often deposited between the component and the TBC forms a thermally grown oxide layer (TGO) when subjected to heat during normal engine operation. Accordingly, during conventional in situ repair procedures, the TBC must bond to the TGO. This may fail to yield robust TBC for a number of reasons, including inadequate chemical bonds between the TBC and the TGO and differences in their respective thermal expansion coefficients, which may add unwanted thermal stresses on those chemical bonds.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

DETAILED DESCRIPTION

Figure 6:
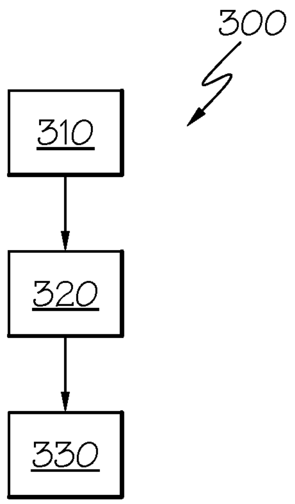
FIG. 6 schematically depicts an illustrative method of repairing the component of FIG. 1, according to one or more embodiments shown and described herein.
Figure 7:
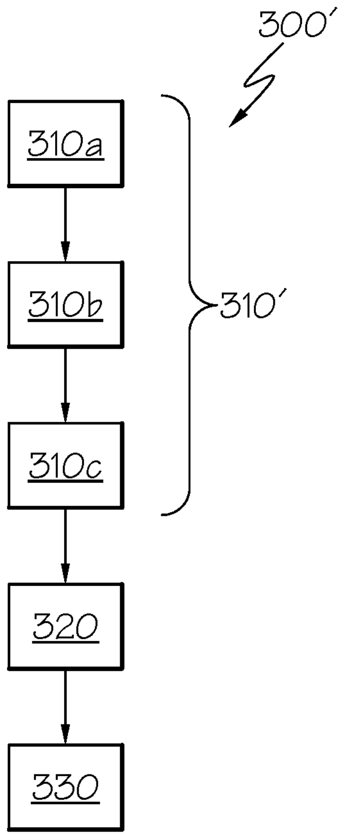
FIG. 7 schematically depicts another method of repairing the component of FIG. 1, according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. The present disclosure generally relates to methods of repairing localized spallation of a TBC of a component as depicted in FIGS. 1-5. FIGS. 6 and 7 schematically depicts flow diagrams of illustrative methods for in-situ repair of localized spallation of a TBC of a component. The method of repair generally includes depositing a primer slurry on the area of localized spallation, depositing a ceramic slurry on the primer slurry, and heating the primer slurry and the ceramic slurry. Heating the primer slurry and the ceramic slurry may cure the primer slurry and the ceramic slurry to form a primer layer and a repair TBC layer, respectively. Chemical bonds may form between each of the layers such that the repair TBC adheres to the component. In embodiments, each step of the method may be performed in-situ such that the repair TBC may be applied on-wing, thereby avoiding the need to remove components from the wing of an aircraft for the purposes of repair.

Directional terms as used herein—for example up, down, right, left, front, back, top, bottom—are made only with reference to the figures as drawn and are not intended to imply absolute orientation unless otherwise specified.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Figure 1:
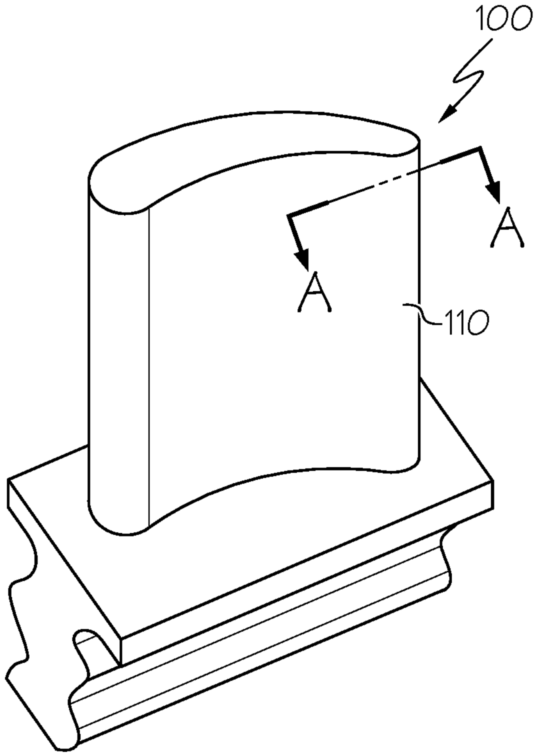
FIG. 1 schematically depicts a perspective view of an illustrative component having a thermal barrier coating, according to one or more embodiments shown and described herein.
Figure 2:
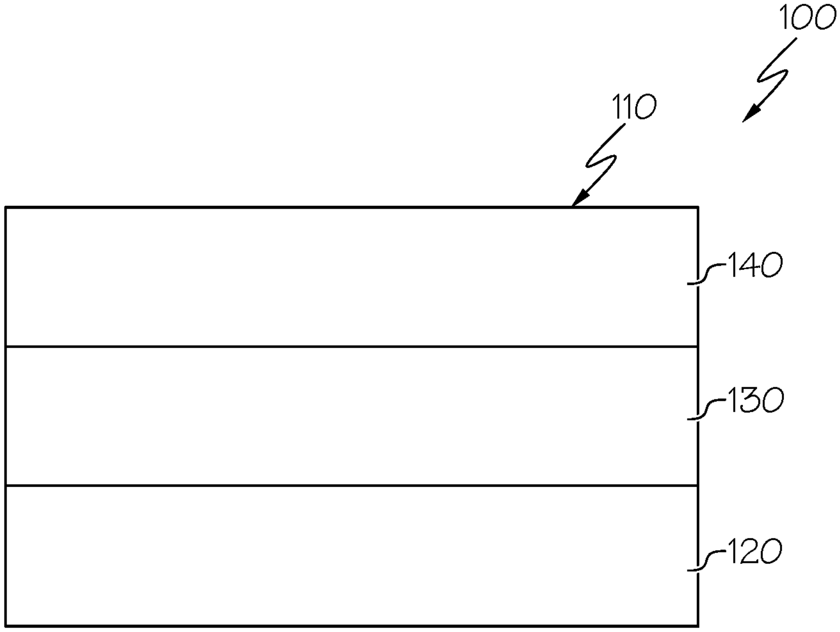
FIG. 2 schematically depicts a partial cross sectional view through the component of FIG. 1 taken along section A-A and showing the thermal barrier coating, bond coat, and base material of a material system, according to one or more embodiments shown and described herein.

Referring to FIGS. 1 and 2 in combination, FIG. 1 schematically depicts an illustrative component 100 having an initial material system 110, and FIG. 2 schematically depicts the initial material system 110. The initial material system 110 may include a base material 120 of the component 100, a bond coat 130, and a thermal barrier coating ("TBC") 140. The base material 120 may be any material suitable for engine operation, such as, for example, a metal or a composite material, such as a nickel-based alloy, cobalt-based alloy, or ceramic matric composite. The bond coat 130 may be an environmentally protective material such as NiCrAlY, Platinum aluminide (PtAl), or other platinum or aluminum based coating. The TBC 140 may be a thermally insulative material such as a ceramic material including an oxide. The oxide may be any suitable oxide such as aluminum oxide ("alumina"), hafnium oxide ("hafnia"), or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, Scandia stabilized zirconia, magnesia-stabilized zirconia, ytterbia stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

As depicted in FIG. 1, the component 100 may be assembled into an engine and initially have the initial material system 110. As a non-limiting example, the component 100 may be a turbine blade, which may be assembled into a jet engine. Accordingly, the component 100 may be subjected to a surrounding high temperature, such as a temperature above 1,500° F., 2,000° F., 2,500° F., or 3,000° F. The component 100 may have an internal cooling system (not depicted) such that a temperature of the component 100 during operation may be less than the surrounding high temperature. Accordingly, a thermally insulative coating, such as the TBC 140 of the initial material system 110 may assist in lowering the temperature of the component 100 during operation. However, it will be appreciated that the component 100 may be any component that may benefit from a thermally insulative material system such as the initial material system 110.

Figure 3:
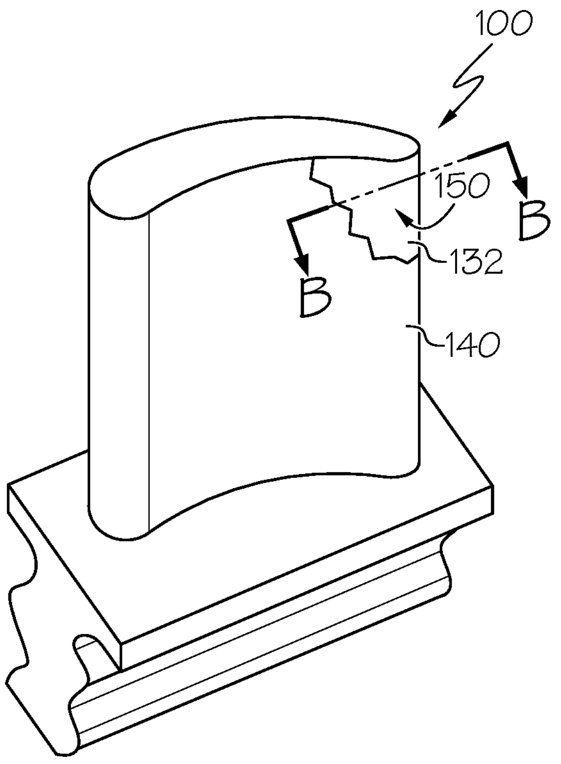
FIG. 3 schematically depicts a perspective view of the component of FIG. 1 with localized spallation, according to one or more embodiments shown and described herein.
Figure 4:
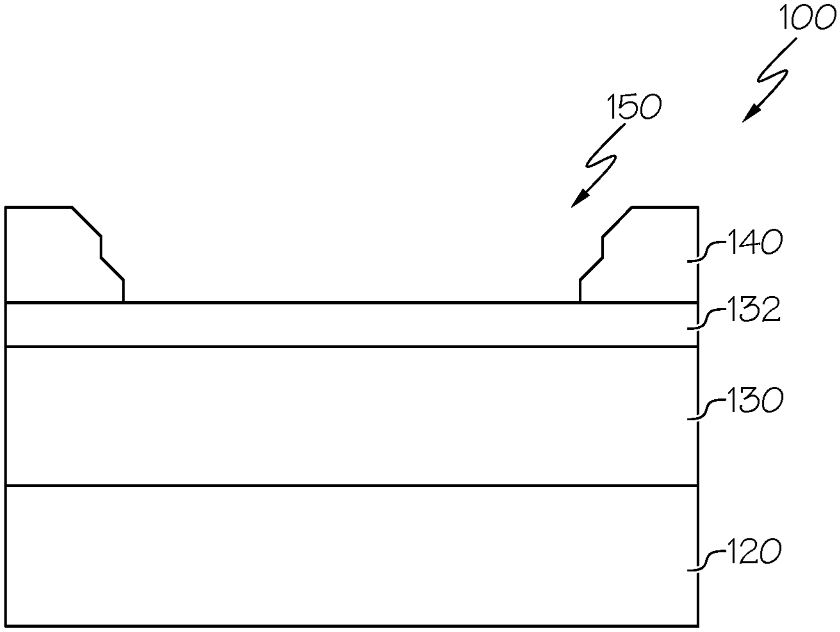
FIG. 4 schematically depicts a partial cross sectional view through the component of FIG. 1 taken along section B-B and showing the thermal barrier coating, thermally grown oxide, bond coat, and base material of a material system with localized spallation in the thermal barrier coating, according to one or more embodiments shown and described herein.

Referring now to FIGS. 3 and 4, the initial material system 110 of the component 100 is depicted after engine operation. As shown in FIGS. 3 and 4, the bond coat 130 may develop a layer of thermally grown oxide ("TGO") 132 on top of the bond coat 130 as a result of temperatures experienced by the bond coat 130 during engine operation. Specifically, a high surrounding temperature, such as a temperature above 1,500° F., 2,000° F., 2,500° F., or 3,000° F. may cause oxidation of the bond coat 130, thereby resulting in growth of the TGO 132. The TGO 132 may include $Al_2O_3$, NiO, $Cr_2O_3$, or other oxides or their combinations. As will be appreciated, the precise chemical composition of the TGO 132 is dependent on the chemical composition of the bond coat 130. For example, if the bond coat 130 is predominantly comprised of PtAl, then the TGO 132 may be predominantly comprised of $Al_2O_3$. In some embodiments, the TGO may have a thermal expansion coefficient between about 4 parts per million per 1 Kelvin change in temperature (PPM/K) and about 10 PPM/K.

Still referring to FIGS. 3 and 4, in some instances, the component 100 may have localized spallation 150 resulting from engine operation. Specifically, in some instances, during engine operation, the TBC 140 may be damaged due to temperature cycling, calcium-magnesium-alumino-silicate (CMAS) infiltration, foreign object damage, and other reasons. For example, cyclic thermal stresses resulting from cycling a jet engine may cause cracking and ultimately the localized spallation 150 of the TBC 140. As another example, if a jet engine ingests a bird or other foreign object, debris from the foreign object may strike the component 100 and result in the localized spallation 150. As depicted, the localized spallation 150 may remove a portion of the TBC 140 and may leave the TGO 132 exposed. Accordingly, the component 100 may require repair of the TBC 140 to ensure that the component 100 is fully insulated when operating at high temperatures. Conventional repair techniques may include removal of the component from service, followed by stripping of the coatings and subsequent recoating. These conventional repair techniques are cost ineffective and may result in significant equipment down time. Conventional repair techniques in which a patch is applied to the localized spallation may be ineffective due to poor adhesion of the patch to the underlying layers of the existing coating. Embodiments described herein may overcome these shortcomings of conventional repair techniques.

Figure 5:
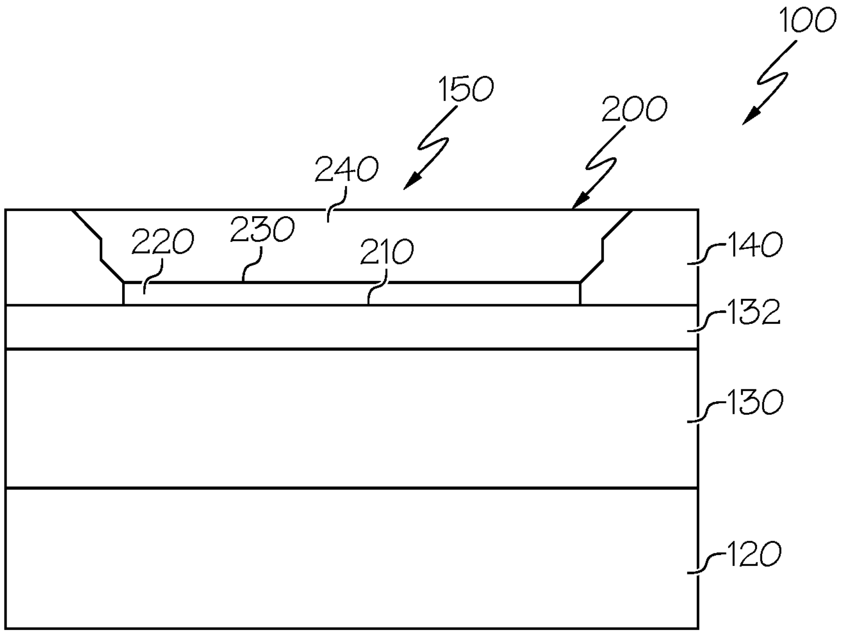
FIG. 5 schematically depicts a partial cross sectional view through the component of FIG. 1 after repair, according to one or more embodiments shown and described herein.

Referring now to FIG. 5, a material system 200, which provides in-situ repair of the localized spallation 150 of the TBC 140 of the initial material system 110 of the component 100 (as shown in FIGS. 3 and 4), is schematically depicted. The material system 200 includes a primer layer 220 and a repair TBC 240. Similar to the TBC 140 of the initial material system 110, the repair TBC 240 may be a thermally insulative material such as a ceramic material including an oxide. In particular, the repair TBC 240 may be a ceramic material including zirconia. As described with reference to the TBC 140 above, in embodiments, the zirconia may be a stabilized zirconia. In some embodiments, the repair TBC may include $ZrO_2$ with 8% to 55% $Y_2O_3$ by weight. In some embodiments, the repair TBC 240 may the same or substantially the same as the TBC 140. In other embodiments, the repair TBC 240 may differ from the TBC 140. In light of the foregoing, the repair TBC 240 may have a thermal expansion coefficient generally between about 8 PPM/K and about 12 PPM/K, although the exact thermal expansion coefficient depends on the composition of the repair TBC 240.

In embodiments, the primer layer 220 may comprise metals, metal oxides (ceramics), polymers, and/or combinations thereof. In embodiments, the primer layer may comprise a metal such as Aluminum (Al), Titanium (Ti), Silicon (Si), Magnesium (Mg), Chromium (Cr), Nickel (Ni), Hafnium (Hf) or any other suitable metal. In embodiments, the primer layer 220 may be predominantly or exclusively a metal oxide such as Silicon dioxide ($SiO_2$), Magnesium oxide (MgO), Chromium (III) oxide ($Cr_2O_3$), Nickel (II) Oxide (NiO), Aluminum oxide ($Al_2O_3$), Titanium dioxide ($TiO_2$), Hafnium dioxide ($HfO_2$), and the like. In some embodiments, the primer layer 220 may include a combination of such metal oxides. In some embodiments, the primer layer 220 may include a combination of metals and metal oxides. For example, the primer may comprise at least one metal or metal oxide selected from the group consisting of Si, Al, Mg, Cr, Ni, Hf, $Al_2O_3$, $TiO_2$, $SiO_2$, MgO, $Cr_2O_3$, NiO, $HfO_2$ and combinations thereof. The primer layer 220 may form a first chemical bond 210 between the TGO 132 and the primer layer 220 and may form a second chemical bond 230 between the primer layer 220 and the repair TBC 240. This may be beneficial in some embodiments as it may promote adhesion of the primer layer 220 to the TGO 132 and of the repair TBC 240 to the primer layer 220. Accordingly, the material system 200 may adhere to the component 100 during engine operation and may therefore thermally insulate the location of localized spallation 150.

Still referring FIG. 5, in some embodiments, the primer layer 220 may have a thermal expansion coefficient between 4 PPM/K and 10 PPM/K. However, it is noted that other thermal expansion coefficients are contemplated and possible. Accordingly, in some embodiments, the primer layer 220 may have a thermal expansion coefficient similar to the thermal expansion coefficient of the repair TBC 240. This may be beneficial in some embodiments as it may reduce stress acting on the second chemical bond 230 between the primer layer 220 and the repair TBC 240 as a result of thermal expansion during engine operation.

Similarly, in some embodiments, the primer layer 220 may have a thermal expansion coefficient similar to the thermal expansion coefficient of the TGO 132 (e.g., the TGO may have a thermal expansion coefficient between about 3 PPM/K and 11 PPM/K). This may be beneficial in some embodiments as it may reduce stress acting on the first chemical bond 210 between the TGO 132 and the primer layer 220 as a result of thermal expansion during engine operation.

For example, in a non-limiting embodiment, the TGO 132 may have a thermal expansion coefficient of about 8 PPM/K; the primer layer 220 may have a thermal expansion coefficient of about 9 PPM/K; and, the repair TBC 240 may have a thermal expansion coefficient of about 10 PPM/K. In such an embodiment, the maximum difference in thermal expansion coefficients between the TGO 132 and the primer layer 220, and between the repair TBC 240 and the primer layer 220, may therefore be about 1 PPM/K. Contrastingly, if the primer layer 220 were not included in the material system 200, then the maximum difference in thermal expansion coefficients would be the difference between the thermal expansion coefficient of the TGO 132 and the thermal expansion coefficient of the repair TBC 240, or about 2 PPM/K. Thus, it will be appreciated that, because the primer layer 220 may decrease the maximum difference in thermal expansion coefficients between the TGO 132, the primer layer 220, and the repair TBC 240, the primer layer 220 may decrease the amount of stress acting on the material system 200 as a result of thermal growth during engine operation. The material system 200 may therefore be a more robust system during engine operation.

In embodiments, the thickness of the primer layer 220 may be between about 0.1 and about 4.0 mils. For example, in some embodiments, the thickness of the primer layer 220 may be about 0.5 mils. However, other thicknesses are contemplated and possible. In embodiments, the thickness of the primer layer 220 may be selected to minimize thermal stresses through the material system 200.

Referring now to FIGS. 5 and 6 in combination, FIG. 6 schematically depicts a method 300 of repairing the localized spallation 150. In embodiments, a primer depositing step 310 of the method 300 may include depositing a primer slurry onto the TGO 132 of the component 100 at the area of the localized spallation 150. The primer slurry may form the primer layer 220 when cured.

The primer slurry may include a primer, a binder, and a fluid carrier. The primer may be a metal such as Aluminum (Al), Titanium (Ti), Silicon (Si), Magnesium (Mg), Chromium (Cr), Nickel (Ni), Hafnium (Hf) or any other suitable metal, an oxide such $Al_2O_3$, $TiO_2$, $SiO_2$, MgO, $Cr_2O_3$, NiO, $HfO_2$, or any other suitable oxide, or a combination or mixture thereof. In embodiments wherein the primer is an oxide or a combination including an oxide, the oxide may be derived from an organometallic precursor. The binder may be an organic binder or a silicone based binder. The fluid carrier may be methanol, ethanol, propanol, butanol, and the like. The fluid carrier may decrease a viscosity of the primer slurry, which may make it easier to deposit the primer slurry onto the component 100.

Still referring to FIGS. 5 and 6, after the primer depositing step 310, the method 300 may include a TBC depositing step 320. In embodiments, the TBC depositing step 320 may include depositing a ceramic slurry onto the primer slurry. The ceramic slurry may form the repair TBC 240 when cured.

The ceramic slurry may include any and all of the thermally insulative materials described hereinabove. For example, the ceramic slurry may include a ceramic material comprising solid zirconia particles. The ceramic slurry may also include a binder material, a fluid carrier, or both such as described with respect to the primer slurry above.

Referring to FIGS. 5 and 6 in combination, after the TBC depositing step 320, the method 300 may include a curing step 330. In embodiments, the curing step 330 may include heating the primer slurry and the ceramic slurry deposited on the component 100. For example, in some embodiments, the primer slurry and the ceramic slurry may be heated to a temperature between 1200° C. and 1350° C. Accordingly, the primer slurry and the ceramic slurry may be cured such that they form the primer layer 220 and the repair TBC 240, respectively. As will now be appreciated, in light of FIGS. 5 and 6, in some embodiments, when the primer slurry and the ceramic slurry are cured to form the primer layer 220 and the repair TBC 240, the primer layer 220 may form the first chemical bond 210 between the TGO 132 and the primer layer 220 and the second chemical bond 230 between the primer layer 220 and the repair TBC 240. That is, the primer layer 220 functions as a bridge between the TGO 132 and the repair TBC 240. For example and without limitation, primer layers comprising $TiO_2$, $SiO_2$, and/or MgO and the like may react with both the TGO 132 and the TBC 240 and form a reaction product bonding the materials of the different layers. In some embodiments, when the primer slurry is cured to form the primer layer 220, the primer layer 220 may have a rough or spiked chemical structure at or near the second chemical bond 230 between the primer layer 220 and the repair TBC 240. For example, in some embodiments, the chemical structure of the primer layer 220 may form protrusions such that the surface of the primer layer 220 bordering the repair TBC 240 is not smooth. This may be beneficial in some embodiments as it may strengthen adhesion between the primer layer 220 and the repair TBC 240.

Referring now to FIG. 7, another illustrative method 300' of repair is schematically depicted. The method 300' may have certain steps that are similar to various steps of the method 300 depicted in FIG. 6. Accordingly, like numbers may be used to refer to like features in FIG. 7. In embodiments, the method 300' may have a primer depositing step 310'. In some embodiments, the primer depositing step 310' includes a plurality of sub-steps such as sub-steps 310*a-c*. The first sub-step 310*a* may include depositing a first layer of primer slurry onto the TGO 132 of the component 100 at the area of the localized spallation 150. The second sub-step 310*b* may include depositing a second layer of primer slurry onto the first layer of primer slurry. Similarly, the third sub-step 310*c* may include depositing a third layer of primer slurry onto the second layer of primer slurry. It is noted that while the primer depositing step 310 is depicted as having three sub-steps, in other embodiments, the primer depositing step 310 may have a greater or fewer number of sub-steps. In some embodiments, the primer depositing step 310 may not have sub-steps and may instead be a single step.

Still referring to FIG. 7, in some embodiments, the first layer of primer slurry deposited during the first sub-step 310*a*, the second layer of primer slurry deposited during the second sub-step 310*b*, and the third layer of primer slurry deposited during the third sub-step 310*c* may each have different compositions relative to one another. For example, the first layer of primer slurry deposited during the first sub-step 310*a*, the second layer of primer slurry deposited during the second sub-step 310*b*, and the third layer of primer slurry deposited during the third sub-step 310*c* may each have different concentrations of primer. In some embodiments, the first layer of primer slurry deposited during the first sub-step 310*a* may have a higher concentration of primer than the second layer of primer slurry or the third layer of primer slurry. Accordingly, in some embodiments, the resulting primer slurry deposited on the component 100 during the primer depositing step 310 may form a primer concentration gradient wherein the concentration of primer is highest near the TGO 132. For example, the primer concentration of the first layer deposited during the first sub-step 310*a* may be about 80% by weight; the primer concentration of the second layer deposited during the second sub-step 310*b* may be about 40% by weight; and, the primer concentration of the third layer deposited during the third sub-step 310*c* may be about 5% by weight. This may be beneficial in some embodiments as the primer concentration of the first layer may be selected for better adhesion to the TGO 132 while the primer concentration of the third layer, or a final layer, may be selected for better adhesion to the repair TBC 240. However, other variations in primer slurry composition are contemplated and possible.

Referring to FIGS. 5-7, as described herein, it may be beneficial to perform a method of repair such as the method 300 or 300' in-situ, or "on-wing." In other words, for embodiments in which the component 100 is a component of a jet engine, it may be beneficial to perform the method 300 or 300' while the component 100 remains assembled within the jet engine and while the jet engine remains on the wing of an aircraft. In some embodiments, the method 300 or 300' may be performed on a substantially assembled jet engine or engine module. This may save time by avoiding unnecessary disassembly and reassembly. Accordingly, in embodiments, each of the primer slurry and the ceramic slurry may be deposited via an apparatus configured for in-situ use. For example, in some embodiments, an apparatus for depositing the primer slurry or the ceramic slurry may include a nozzle sized to fit through a borescope port, ignition port or other engine aperture that is accessible without removing the jet engine from the aircraft. In some embodiments, the apparatus may be a spray nozzle device such as described in U.S. Pat. No. 11,161,128, entitled "Spray Nozzle Device For Delivering a Restorative Coating Through a Hole in a Case of a Turbine Engine", filed Dec. 8, 2017, the disclosure of which is herein incorporated by reference in its entirety. In this way, the nozzle may be positioned at or near the localized spallation 150 without requiring a full engine teardown.

In view of the above, it should now be understood that at least some embodiments of the present disclosure are directed to a method for repairing a thermal barrier coating deposited on a component with localized spallation of the thermal barrier coating. The method of repair generally includes depositing a primer slurry on the area of localized spallation, depositing a ceramic slurry on the primer slurry, and heating the primer slurry and the ceramic slurry. Heating the primer slurry and the ceramic slurry may cure the primer slurry and the ceramic slurry to form a primer layer and a repair TBC layer, respectively. Chemical bonds may form between each of the layers such that the repair TBC adheres to the component. In embodiments, each step of the method may be performed in-situ such that the repair TBC may be applied on-wing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the present disclosure are provided by the subject matter of the following clauses:

Clause 1: A method for repairing a thermal barrier coating deposited on a component with localized spallation of the thermal barrier coating, includes depositing a primer slurry on a thermally grown oxide of the component exposed by the localized spallation, the primer slurry comprising a primer that includes at least one of a metal and a metal oxide; depositing a ceramic slurry on the primer slurry, the ceramic slurry comprising a ceramic material, a ceramic slurry binder material, and a ceramic slurry fluid carrier; and heating the primer slurry and the ceramic slurry to form a first chemical bond between the primer and the thermally grown oxide and a second chemical bond between the primer and the ceramic material.

Clause 2: The method of any preceding clause, wherein the ceramic material comprises solid zirconia particles.

Clause 3: The method of any preceding clause, wherein the ceramic slurry binder material is silicone based.

Clause 4: The method of any preceding clause, wherein the primer includes an organometallic precursor-derived metal oxide.

Clause 5: The method of any preceding clause, wherein the primer comprises Si.

Clause 6: The method of any preceding clause, wherein the primer comprises $SiO_2$.

Clause 7: The method of any preceding clause, wherein the primer comprises MgO.

Clause 8: The method of any preceding clause, wherein the primer comprises Al.

Clause 9: The method of any preceding clause, wherein the primer comprises $Cr_2O_3$.

Clause 10: The method of any preceding clause, wherein the primer comprises $Al_2O_3$.

Clause 11: The method of any preceding clause, wherein the primer slurry comprises a primer slurry binder material having a different composition than the ceramic slurry binder material.

Clause 12: The method of any preceding clause, wherein the primer slurry comprises a first primer slurry and a second primer slurry having a different composition than the first primer slurry.

Clause 13: The method of any preceding clause, wherein the first primer slurry has a higher concentration of primer than the second primer slurry.

Clause 14: The method of any preceding claim, wherein the heating the primer slurry and the ceramic slurry forms a primer layer comprising the primer and a repair thermal barrier coating comprising the ceramic material; and the first chemical bond bonds the primer layer to the thermally grown oxide and the second chemical bond bonds the primer layer to the repair thermal barrier coating; and the primer layer has a thickness between 0.1 and 4 mils.

Clause 15: The method of any preceding clause, wherein the primer layer has a thermal expansion coefficient between 4 PPM/K and 10 PPM/K.

Clause 16: The method of any preceding clause, wherein the primer layer has a thickness of about 0.5 mils.

Clause 17: The method of any preceding clause, wherein the method is performed in-situ.

Clause 18: A material system for in-situ repair of a thermal barrier coating deposited on a component with localized spallation of the thermal barrier coating, includes a primer slurry and a ceramic slurry. The primer slurry includes a primer chemically for bonding to a thermally grown oxide of the component exposed by the localized spallation, wherein the primer includes at least one of a metal and a metal oxide. The ceramic slurry includes a ceramic material, a binder material, and a fluid carrier, wherein the ceramic material is chemically for bonding to the primer and comprises solid zirconia particles.

Clause 19: The system of any preceding clause, wherein the primer includes a metal and an oxide of the same metal.

Clause 20: The system of any preceding clause, wherein the primer includes Ti.

What is claimed is:

1. A method for repairing a thermal barrier coating deposited on a component with localized spallation of the thermal barrier coating, comprising:

depositing a primer slurry on a thermally grown oxide of the component exposed by the localized spallation, the primer slurry comprising a primer that includes at least one of a metal and a metal oxide;

depositing a ceramic slurry on the primer slurry, the ceramic slurry comprising a ceramic material, a ceramic slurry binder material, and a ceramic slurry fluid carrier; and heating the primer slurry and the ceramic slurry to form a first chemical bond between the primer and the thermally grown oxide and a second chemical bond between the primer and the ceramic material, wherein heating the primer slurry and the ceramic slurry forms a primer layer comprising the primer directly bonded to the thermally grown oxide via the first chemical bond and a repair thermal barrier coating comprising the ceramic material directly bonded to the primer layer via the second chemical bond, wherein the primer layer has a thickness between 0.2 mils and 0.6 mils.

2. The method of claim 1, wherein the ceramic material comprises yttria-stabilized zirconia particles.

3. The method of claim 1, wherein the ceramic slurry binder material is silicone based.

4. The method of claim 1, wherein the primer includes an organometallic precursor-derived metal oxide.

5. The method of claim 1, wherein the primer comprises Si.

6. The method of claim 1, wherein the primer comprises $SiO_2$.

7. The method of claim 1, wherein the primer comprises MgO.

8. The method of claim 1, wherein the primer comprises Al.

9. The method of claim 1, wherein the primer comprises $Cr_2O_3$.

10. The method of claim 1, wherein the primer comprises $Al_2O_3$.

11. The method of claim 1, wherein the primer slurry comprises a primer slurry binder material having a different composition than the ceramic slurry binder material.

12. The method of claim 1, wherein the primer slurry comprises a first primer slurry and a second primer slurry having a different composition than the first primer slurry.

13. The method of claim 12, wherein the first primer slurry has a higher concentration of primer than the second primer slurry.

14. The method of claim 13, wherein the first primer slurry comprises 80 wt. % of the primer.

15. The method of claim 13, wherein the second primer slurry comprises 40 wt. % of the primer.

16. The method of claim 12, wherein the primer slurry further comprises a third primer slurry comprising 5 wt. % of the primer.

17. The method of claim 1, wherein:

the first chemical bond bonds the primer layer to the thermally grown oxide and the second chemical bond bonds the primer layer to the repair thermal barrier coating.

18. The method of claim 17, wherein the primer layer has a thermal expansion coefficient between 4 PPM/K and 10 PPM/K.

19. The method of claim 1, wherein the method is performed on wing.

* * * * *